United States Patent
Schroll

(10) Patent No.: US 9,717,190 B2
(45) Date of Patent: Aug. 1, 2017

(54) MINIATURE IRRIGATION TOW LINE

(71) Applicant: John J Schroll, Grand Island, NE (US)

(72) Inventor: John J Schroll, Grand Island, NE (US)

( * ) Notice: Subject to any disclaimer, the term of this patent is extended or adjusted under 35 U.S.C. 154(b) by 0 days.

(21) Appl. No.: 14/857,129

(22) Filed: Sep. 17, 2015

(65) Prior Publication Data

US 2017/0079222 A1  Mar. 23, 2017

(51) Int. Cl.
*A01G 25/00* (2006.01)
*A01G 25/09* (2006.01)
*B05B 15/06* (2006.01)
*B05B 1/32* (2006.01)

(52) U.S. Cl.
CPC ............. *A01G 25/09* (2013.01); *B05B 1/32* (2013.01); *B05B 15/063* (2013.01)

(58) Field of Classification Search
CPC .......... A01G 25/09; B05B 1/32; B05B 15/063
USPC ................................ 239/111, 726, 730, 732
See application file for complete search history.

(56) References Cited

U.S. PATENT DOCUMENTS

| | | | |
|---|---|---|---|
| 2,889,993 A | 6/1959 | B et al. | |
| 3,324,876 A | 6/1967 | William | |
| 3,516,609 A * | 6/1970 | Gheen | A01G 25/09 180/24.11 |
| 4,832,263 A | 5/1989 | Poynor | |
| 5,195,392 A * | 3/1993 | Moore | F16L 55/18 138/97 |
| 5,447,274 A | 9/1995 | Tofin et al. | |
| 7,207,503 B1 | 4/2007 | Stengel et al. | |
| 7,740,195 B1 * | 6/2010 | Daniels | A01G 25/09 239/200 |
| 2013/0180603 A1 | 7/2013 | Clevenger et al. | |

* cited by examiner

*Primary Examiner* — Arthur O Hall
*Assistant Examiner* — Viet Le
(74) *Attorney, Agent, or Firm* — The Keys Law Firm PLLC

(57) ABSTRACT

A miniature irrigation tow line for use in irrigating average to small sized acreages includes a modified hose defining a conventionally sized hose having water regulator valves sequentially disposed thereon, with a miniature skid attached to the hose at the location of each water regulator valve. The regulator valves are each connected to a water sprinkler nozzle and attached to the modified hose over an aperture in the hose, thereby enabling fluid passing through the length of the hose to be selectively dispersed from the sprinkler nozzle(s). The miniature skids permit the miniature irrigation tow line to be pulled along a ground surface with the regulator value and sprinkler nozzles kept in a desired orientation and without damaging the modified hose.

10 Claims, 1 Drawing Sheet

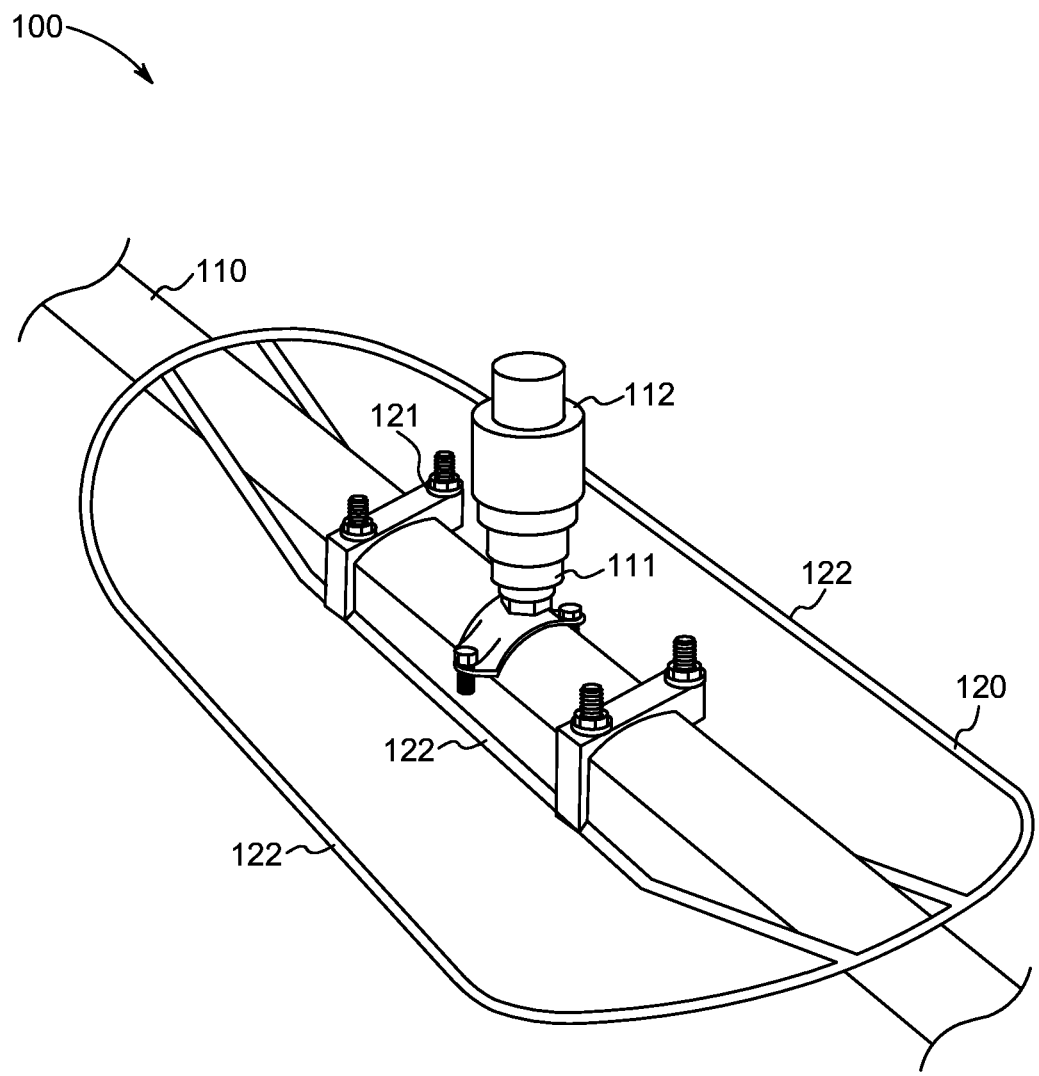

MINIATURE IRRIGATION TOW LINE

BACKGROUND OF THE INVENTION

Field of the Invention

This invention relates generally to tow line irrigation devices and, more particularly, to a miniature irrigation skid apparatus adapted to attach to a hose for towing across acreages.

Description of the Prior Art

The use of tow lines in sprinkler systems for watering large areas is well known. A problem which still exists, however, with existing tow lines is due to the use of large, expensive pipe, conventionally constructed of a rigid material like aluminum, irrigating average to small sized acreages can be very inefficient and difficult. This problem is amplified when such acreages require navigating around curves. Thus, there remains a need for a miniature irrigation tow line which employs a modified conventional hose adapted to be towed as conventional tow lines. It would be helpful if such a miniature irrigation tow line included a modified hose configured with a plurality of plastic regulators and sprinklers assemblies attached to a plurality of spaced out skids, each sized for the hose. It would be additionally desirable for such a miniature irrigation tow line to be able to be towed around curves due to the flexibility of the hose.

The Applicant's invention described herein provides for a miniature irrigation tow line adapted to employ a conventional hose as an irrigation tow line. The primary components in Applicant's miniature irrigation tow line are a miniature skid, a hose, a plastic regulator and a sprinkler. When in operation, the miniature irrigation tow line provides a more economical irrigation tow line for agriculturalists of average to small sized acreages. As a result, many of the limitations imposed by prior art structures are removed.

SUMMARY OF THE INVENTION

A miniature irrigation tow line for use in irrigating average to small sized acreages. The miniature irrigation tow line includes a modified hose defining a conventionally sized hose having water regulator valves sequentially disposed thereon, with a miniature skid attached to the hose at the location of each water regulator valve. The regulator valves are each connected to a water sprinkler nozzle and attached to the modified hose over an aperture in the hose, thereby enabling fluid passing through the length of the hose to be selectively dispersed from the sprinkler nozzle(s). The miniature skids include a plurality of runners which permit the miniature irrigation tow line to be pulled along a ground surface with the regulator value and sprinkler nozzles kept in a desired orientation and without damaging the modified hose.

It is an object of this invention to provide a miniature irrigation tow line which employs a modified conventional hose adapted to be towed as conventional tow lines.

It is another object of this invention to provide a miniature irrigation tow line which includes a modified hose configured with a plurality of plastic regulators and sprinklers assemblies attached to a plurality of spaced out skids, each sized for the hose.

It is yet another object of this invention to provide a miniature irrigation tow line able to be towed around curves due to the flexibility of the hose.

These and other objects will be apparent to one of skill in the art.

BRIEF DESCRIPTION OF THE DRAWINGS

FIG. 1 is a left side elevational view of a section of a miniature irrigation tow line built in accordance with the present invention.

DETAILED DESCRIPTION OF THE INVENTION

Referring now to the drawings and in particular FIG. 1, a section of miniature irrigation tow line 100 is shown having a modified hose 110 and a miniature skid 120. The hose 110 is defined as a conventional plastic or large rubber hose having a water regulator valve 111 attached thereto. The regulator valve 111 is defined in the preferred embodiment as a conventional plastic regulator. The regulator valve 111 is attached to the modified hose 110 over an aperture (not shown) in the hose 110, enabling fluid passing through the length of the hose to enter the regulator valve 111 (when open).

The regulator valve 111 is connected to a water sprinkler nozzle 112. When the regulator valve 111 is set to enable water to enter and pass through, a portion of the water passing through the hose 110 is directed into and through the regulator valve 111 and into and through the sprinkler nozzle 112. Water which passes through the sprinkler nozzle 112 is then dispersed in the ordinary manner that water is dispensed through conventional sprinkler nozzles. By this action, water passing through the hose 110 is used to water the area surrounding the hose 110 through the sprinkler nozzle 112.

It is contemplated that the regulator valve 111 and sprinkler nozzle 112 are operable through water passing through the hose 110 provided it exceeds a minimum speed/pressure. In the preferred embodiment, such a speed/pressure is the conventional speed/pressure output of 1.5 horsepower submersible pump. It is contemplated, however, that a pumping mechanism of any size may be employed provided it considers the output of the well and how many sprinklers are desired to be run.

The area of the hose 110 on either side of the regulator valve 111 is attached to a miniature skid apparatus 120 through a pair of screw operated coupling clamps 121. The miniature skid apparatus 120 is defined in the preferred embodiment as a skid having four discrete runners 122 and ⅜ inch high tensile strength steel rod. In the preferred embodiment, the miniature skid apparatus 120 is sized 24" by 13" and made to fit a 1.5" or a 2" plastic hose.

It is noted that while only three of the runners 122 are visible in FIG. 1, one of skill in the art would recognized that the two runners 122 on the right side of the hose 110 (only one of which is visible are mirror images of the two runners 122 on the left side of the hose 110 (which are both visible).

It is understood that while just a section of the miniature irrigation tow line 100 is shown, in the preferred embodiment, the entire miniature irrigation tow line 100 would include a plurality of discrete skid apparatus 120 attached adjacent to valve 111 and nozzle 112 assemblies. In addition, it is understood that the miniature irrigation tow line 100 would include a first end and a second end, either of which could be plugged or connected to a pump while in use or attached to a tractor (or other towing device) to enable the entire miniature irrigation tow line 100 to be moved.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An irrigation tow line, comprising:
   a modified hose having an exterior tube surface, wherein said modified hose defines a tubular body having at least one regulator valve attached to an aperture in the exterior tube surface;
   one skid fixed to the modified hose on either side of each regulator valve through an attachment member, thereby integrating the modified hose with the skid, wherein said skid includes an exterior runner on either side of the modified hose that runs in parallel with the modified hose and at least one interior runner on either side of the modified hose that runs in parallel with the modified hose; and
   wherein said skid includes a continuous perimeter of which each of the exterior runners on either side of the modified hose form a portion and the at least one interior runners and the attachment members do not extend beyond the structural profile formed by the perimeter.

2. The irrigation tow line of claim 1, wherein said attachment member defines a releasable coupling clamp.

3. The irrigation tow line of claim 2, additionally comprising a sprinkler nozzle integral with at least one of said at least one regulator valves, thereby configuring the modified hose to selectively disperse fluid passing through the tubular body to the area surrounding the hose.

4. The irrigation tow line of claim 1, additionally comprising a sprinkler nozzle integral with at least one of said at least one regulator valves, thereby configuring the modified hose to selectively disperse fluid passing through the tubular body to the area surrounding the hose.

5. The irrigation tow line of claim 4, wherein said attachment member defines a releasable coupling clamp.

6. The irrigation tow line of claim 1, wherein said attachment member defines a releasable coupling clamp.

7. The irrigation tow line of claim 1, wherein each vertex of the contiguous perimeter is curved.

8. A skid for an irrigation tow line, comprising:
   a skid having at least one attachment member which adapts the skid to be fixed to an elongated tubular body, an exterior runner adapted to be positioned on either side of and in parallel with the tubular body to which the skid is fixed, and at least one interior runner adapted to be positioned on either side of and in parallel with the tubular body to which the skid is fixed; and
   wherein said skid includes a continuous perimeter of which each of the exterior runners on either side of the modified hose form a portion and the at least one interior runners and the attachment members do not extend beyond the structural profile formed by the perimeter.

9. The irrigation tow line of claim 8, wherein each vertex of the contiguous perimeter is curved.

10. The irrigation tow line of claim 8, wherein said attachment member defines a releasable coupling clamp.

* * * * *